United States Patent [19]
Van De Berg et al.

[11] Patent Number: 6,040,385
[45] Date of Patent: Mar. 21, 2000

[54] ADHESION PROMOTERS FOR PLASTISOLS

[75] Inventors: Albert Van De Berg, Kreuzau; Doris Fitzek, Duren, both of Germany

[73] Assignee: Air Products and Chemicals, Inc., Allentown, Pa.

[21] Appl. No.: 08/356,663

[22] Filed: Dec. 15, 1994

[30]  Foreign Application Priority Data

Dec. 15, 1993 [DE] Germany ............................ 43 42 672

[51] Int. Cl.[7] .................................................. C08L 39/04
[52] U.S. Cl. .......................... 525/205; 525/206; 525/207; 525/223; 525/227; 525/239; 525/379; 525/381; 525/382; 525/327.6; 525/326.7
[58] Field of Search .................................. 525/131, 207, 525/239, 379, 381, 382, 205, 206, 223, 227, 327.6, 326.7

[56]  References Cited

U.S. PATENT DOCUMENTS

| | | | |
|---|---|---|---|
| 3,291,731 | 12/1966 | Crowley et al. | 252/25 |
| 3,917,550 | 11/1975 | Clas et al. | 260/23 EP |
| 4,046,747 | 9/1977 | Capelle et al. | 260/785 |
| 4,065,608 | 12/1977 | Beck et al. | 526/49 |
| 4,093,097 | 6/1978 | Wszolek | 215/349 |
| 4,146,520 | 3/1979 | Bierwirth et al. | 260/23 XA |
| 4,357,250 | 11/1982 | Hayashi | 252/51.5 A |
| 4,357,440 | 11/1982 | Schreck | 524/535 |
| 4,440,900 | 4/1984 | Bruba et al. | 524/569 |
| 4,480,056 | 10/1984 | Parks | 523/122 |
| 4,533,524 | 8/1985 | Burba et al. | 427/372.2 |
| 4,547,224 | 10/1985 | Schilling | 106/273 |
| 4,578,424 | 3/1986 | Goel | 525/109 |
| 4,668,412 | 5/1987 | Hart et al. | 252/51.5 A |
| 4,673,710 | 6/1987 | Burba et al. | 525/111.5 |
| 4,791,164 | 12/1988 | Wichelhaus et al. | 524/514 |
| 4,919,757 | 4/1990 | Ohmae et al. | 162/164.3 |
| 4,935,476 | 6/1990 | Hasenbein et al. | 526/217 |
| 4,948,850 | 8/1990 | Hasenbein et al. | 526/217 |
| 5,120,795 | 6/1992 | Filges et al. | 525/286 |
| 5,130,378 | 7/1992 | Blum et al. | 525/327.6 |
| 5,182,326 | 1/1993 | Leblanc et al. | 524/514 |
| 5,188,693 | 2/1993 | Nagata et al. | 156/244.11 |
| 5,229,467 | 7/1993 | Jung | 525/379 |
| 5,236,785 | 8/1993 | Kaburaki et al. | 428/522 |
| 5,248,562 | 9/1993 | Palermo | 428/522 |
| 5,278,225 | 1/1994 | Kohlhammer et al. | 524/560 |

FOREIGN PATENT DOCUMENTS

| | | |
|---|---|---|
| 2035538 | 8/1991 | Canada . |
| 0 171 850 | 2/1986 | European Pat. Off. . |
| 0 276 111 | 7/1988 | European Pat. Off. . |
| 0 293 087 | 11/1988 | European Pat. Off. . |
| 0 331 528 | 9/1989 | European Pat. Off. . |
| 0 360 038 | 3/1990 | European Pat. Off. . |
| 0 378 205 | 7/1990 | European Pat. Off. . |
| 0 558 047 | 9/1993 | European Pat. Off. . |
| 23 27 958 | 1/1975 | Germany . |
| 24 48 344 | 4/1976 | Germany . |
| 25 44 948 | 4/1977 | Germany . |
| 26 54 871 | 6/1978 | Germany . |
| 32 01 265 | 7/1983 | Germany . |
| 32 21 354 | 12/1983 | Germany . |
| 35 04 804 | 8/1986 | Germany . |
| 35 23 480 | 1/1987 | Germany . |
| 38 27 056 | 2/1990 | Germany . |
| 38 30 007 | 12/1992 | Germany . |
| 41 17 487 | 12/1992 | Germany . |
| 294855 | 3/1971 | U.S.S.R. . |
| 618395 | 6/1978 | U.S.S.R. . |
| 635882 | 12/1978 | U.S.S.R. . |
| 90/01502 | 2/1990 | WIPO . |

OTHER PUBLICATIONS

Derwent Abstract No. 78–56570A/31.
Derwent Abstract No. 91–161933/22.

*Primary Examiner*—Fred Zitomer
*Attorney, Agent, or Firm*—Michael Leach

[57]  ABSTRACT

Plastisol adhesion promoters of amidoamines, imidoamines, and esteramines are prepared from copolymers of monounsaturated carboxylic acids, or their derivatives, ethylenically unsaturated compounds, in particular α-olefins, and polyamines.

7 Claims, No Drawings

ADHESION PROMOTERS FOR PLASTISOLS

FIELD OF THE INVENTION

The invention relates to the application of amidoamines, imidoamines, or esteramines from copolymers of unsaturated carboxylic acids, or their derivatives, and ethylenically unsaturated compounds, in particular α-olefins, as adhesion promoters.

BACKGROUND

The main application of adhesion promoters is in so-called plastisols. These are paste-like dispersions of a powdered, fine-particle polymerization product in a plasticizer. The polymers are primarily polyvinyl chloride, polyvinyl chloride copolymers, and polyalkylene methacrylates.

Plastisols are used, among other things, for thermal-insulation and soundproofing layers, glueing and sealing of materials, and protection against corrosion and damage from flying stones, the latter primarily in automobile assembly through application on a variety of metal surfaces. Plastisols have a relatively weak adhesive strength, which in no way meets today's stringent requirements. For example, if after application of the protective layer, the adhesion at certain locations is insufficient or gives way over time due to mechanical stress, the underlying metal can quickly corrode. An adhesive layer can be provided between substrates such as metal surfaces and the protective layer, but this involves a number of disadvantages. It is more advantageous, however, to add an adhesion promoter to the plastisol, enhancing the adhesion of the plastisol mixture itself.

However, the adhesion promoter, integrated in the plastisol before the latter is applied to the surface to be coated, should not only improve adhesion but also contribute to improved plastisol workability and moreover have sufficient thermal stability to prevent undesired discolorations when the coating is baked. Furthermore, the adhesion promoter should enable the use of minimum baking temperatures and times. It should also be efficient enough that these and other objectives can be attained with minimum quantities.

Most adhesion promoters available on the market and also described in the very extensive patent literature and professional journals are manufactured on the basis of polymerized unsaturated fatty acids and polyamines. Condensation of the polymerized fatty acids and the amines results in so-called polyaminoamides with alternating polymer structure.

There has been no lack of attempts to improve the manufacture of the polyaminoamides used for this specific application, including modifying the ratio of monomers, dimers, and trimers constituting the unsaturated fatty acids, or otherwise modifying the chemical structure, such as by using other amines.

In this regard, European patent application 171 850, for example, describes adhesion promoters based on polymerized fatty acids of a specific composition and 1.0 to 2.2 equivalents of a heterocyclic amine, and European patent application 378 205 teaches that mixtures of polyalkylene polyamines and N-aminoalkylpiperazine can be used to construct the polyaminoamides.

The unsaturated fatty acids are natural products whose composition is subject to fluctuations. Furthermore, manufacture of the polyaminoamides is not always controllable.

One of the disadvantages of such products is that they have sometimes lacked the required stability with respect to thermal stress. Uncontrollable reactions often occur during polymerization or condensation, such that it is difficult, if not impossible, to construct an effective polymer with a specific molecular weight. Adhesion and color stability also leave something to be desired at times.

There have also been attempts to construct fully synthetic adhesion promoters, since they are constructed from compounds with a precise chemical definition, rather than from nonuniform natural products, and they are also reproducible with reasonable certainty. Canadian patent application 2,035,538, for example, describes adhesion promoters involving copolymers of aliphatically/olefinically unsaturated compounds and an anhydride. The aliphatically unsaturated compounds can also be α-olefins, and the anhydride can be maleic anhydride. The adhesion promoters described in this cited patent application are not completely satisfactory with respect to improving adhesive effectiveness compared to the adhesion promoters based on polyamines and polymerized fatty acids. Although numerous adhesion promoters are currently known, there is still a need for adhesion promoters with improved characteristics such as adhesion agency, efficiency, thermal stability, color stability, workability, and advantageous production methods.

SUMMARY OF THE INVENTION

An object of the invention is to provide adhesion promoters that offer good adhesion even in small quantities and under moderate baking conditions, favorably influence the workability and flow properties of the plastisols, are thermally stable, impair the plastisol color to a minor extent, and can be reproduced with adjustable characteristic profiles.

This and other objects have been fulfilled by the use of amidoamines, imidoamines, or esteramines from copolymers of unsaturated carboxylic acids, or their derivatives, and ethylenically unsaturated compounds. The ethylenically unsaturated compounds are preferably α-β-unsaturated compounds; these are preferably hydrophobic. Particularly suited are α-olefins, vinyl ethers, and allyl ethers; styrene can also be used. The polyamine preferably has at least one primary amino group.

DETAILED DESCRIPTION OF PREFERRED EMBODIMENTS

Ethylenically unsaturated compounds, e.g., α-β-unsaturated compounds, are used to build the copolymer from monounsaturated carboxylic acids or their derivatives. These compounds are preferably hydrophobic, i.e., they have a hydrophobic radical in the β position. α-Olefins are preferred. Also quite suitable are vinyl ethers such as vinyloctadecyl ether, the respective allyl ethers, and styrene. Copolymers of α-olefins with 10 to 24 carbon atoms are especially advantageous. Preferably, copolymers of maleic acid, maleic anhydride, or fumaric acid, and α-olefins, are employed. Copolymers based on acrylic acid or methacrylic acid or their esters, and α-olefins, are also highly advantageous.

A number of preferred copolymeric amidoamines, imidoamines, and esteramines can be represented by the following Formulas I, II and III:

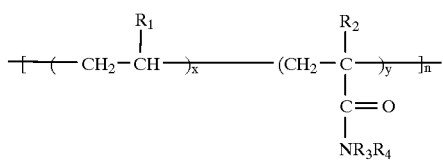

(I)

where x=1; y=1–4; n=5–50; $R_1=C_6-C_{22}$ alkyl radical; $R_2$=H or $CH_3$; $R_3$=H or $C_1-C_3$ alkyl radical; and $R_4$ is a hydrocarbon radical with 2 to 14 carbon atoms and one or more amino groups; or $R_3$ and $R_4$ form a piperazine ring with the amide nitrogen atom;

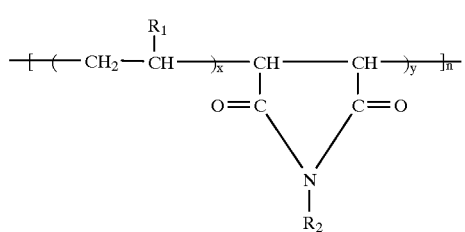

(II)

where x=1; y=1–2; n=5–50; $R_1=C_8-C_{22}$ alkyl radical; and $R_2$ is a hydrocarbon radical with 2 to 14 carbon atoms and one or more amino groups;

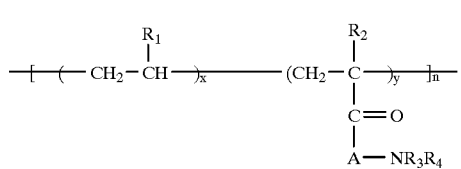

(III)

where x=1; y=1–4; n=5–50; $R_1=C_8-C_{22}$ alkyl radical; $R_2$=H or $CH_3$; A=—$OCH_2CH(OH)$—$CH_2$—; and $R_3$ and $R_4$ are as defined for Formula I.

The invention further relates to a process for producing imidoamines that can preferably be used as adhesion promoters.

This process consists of first using an alcohol to convert copolymers of α-β-unsaturated compounds, preferably α-olefins and unsaturated dicarboxylic acids or their anhydrides, and then converting the resulting polymeric ester to imidoamine using polyamines. The imide is preferably formed in situ.

Production of imidoamines in accordance with the invention can take place as follows. First, a copolymer is produced, in a manner known per se, from an ethylenically unsaturated compound, especially α-olefins, and an unsaturated dicarboxylic acid or its anhydride. Olefins with 10 to 24 carbon atoms are particularly suited as α-olefins. α-olefins with fewer than 10 or more than 24 carbon atoms can also be used, such as 1-hexene or an α-olefins with 30 carbon atoms. Mixtures or blends of α-olefins are also suitable.

Maleic acid or maleic anhydride are especially suited as the unsaturated dicarboxylic acid or anhydride, respectively.

The copolymer is then first converted to the corresponding ester using alcohols such as butanol, isooctanol, or benzyl alcohol, and then transformed into an imide by further addition of a polyamine.

It came as a particular surprise that this production method leads to a stable product with a very uniform structure. It is especially advantageous that gel formation, at times observable during the direct conversion of the copolymeric anhydride or copolymeric acid, does not occur.

In the case of gel formation, the viscosity of the reaction mixture increases sharply, leading to serious problems in production, especially because insufficient mixing and heat exchange can lead to a very nonuniform product. This adverse condition is possibly caused by an amidic acid as an intermediate product in the conversion of copolymeric anhydrides or copolymeric acids with the polyamines.

The invention will be illustrated in more detail with reference to the following Examples, but it should be understood that the present invention is not deemed to be limited thereto.

EXAMPLE 1

The production of a polymeric imidoamine based on an α-olefin/maleic anhydride copolymer, isooctanol, and N-aminoethylpiperazine is described in this example.

1780 g $C_{14/16}$ alpha-olefin (8.7 mole) is placed in a 5 l quick-fit flask, flushed with $N_2$, and heated to 150° C. Within 250 min, maleic anhydride (853 g, 8.7 mole) and di-tert-butylperoxide (34 ml) are then added in 10 portions while stirring. Following an after-reaction of 60 min, the decomposition products of the starting agent are distilled off (100 mbar, 150° C., 45 min). The resulting polymer, as a 50% solution in xylene, has a viscosity of 53 $mm^2/s$ (cSt) at 40° C.

67.5 (0.223 mole) of the resultant copolymeric anhydride is dissolved in 73 g xylene and 58.1 g (0.446 mole) isooctanol under reflux. Then, 28.8 g (0.223 mole) N-aminoethylpiperazine is added dropwise at approximately 145° C. within 5 min, whereby water is continuously removed from circulation. After a further 90 min reaction time, approximately 4 ml water is removed. The product is then dissolved in 130 g dioctylphthalate, and solvent and alcohol separated in a vacuum (150° C., 10 mbar). The resulting approximately 41% brownish-yellow solution (222 g) has a viscosity (Ubbelohde) of 3400 $mm^2/s$ (cSt) at 25° C.

The copolymers of monounsaturated carboxylic acids, or their derivatives, and α-olefins are known per se and are produced using conventional polymerization methods.

The α-olefins can be common linear or branched compounds such as α-hexene, α-octene, or also olefins with higher molecular weights such as α-hexadecene and the like. α-olefins with 10 to 24 carbon atoms are preferred. Mixtures or the commercially available blends are quite suitable.

The other comonomer is selected from monounsaturated carboxylic acids or their derivatives. To produce amidoamines and esteramines for use in accordance with the invention, monounsaturated monocarboxylic acids, such as acrylic acid, methacrylic acid, crotonic acid or their esters, such as methyl or ethyl esters, are employed in particular.

For the preparation of the imidoamines used in the invention, the second comonomer is selected from monounsaturated dicarboxylic acids or their derivatives, particularly their anhydrides. Examples include maleic acid, maleic anhydride, and fumaric acid.

In a particularly advantageous embodiment, the comonomers are glycidyl esters of monounsaturated monocarboxylic acids such as glycidyl methacrylate.

These products can be obtained commercially, for example, from Marubeni Deutschland GmbH, Düsseldorf (Germany) under the trade name Blemmer G, or Röhm GmbH Chemische Fabrik, Darmstadt (Germany) under the trade name GMA.

The copolymers are then converted using polyamines. Amidoamines are thereby produced from copolymers of acrylic acid, methacrylic acid, or their methyl or ethyl esters by reaction of the amino group with the acid or ester function. In the case of copolymers of glycidyl acrylates, the reaction of the amino group with the epoxy group produces esteramines. For copolymers with integrated maleic anhydride and analogous compounds, the primary amino group reacts by forming the imide.

It was particularly surprising that the invention permits good adhesion even with low quantities of the adhesion promoter. The promoters are thermally quite stable and exhibit less impairment of the plastisol color than usual. Production of the adhesion promoters is reproducible. In particular, it is possible to tailor the adhesion promoter to a wide variety of applications by selective chemical structuring. The characteristic profiles can thus be adapted to customer requirements.

This is highly important, because the composition of the plastisols varies from one customer to another. It is possible to use adhesion promoters in accordance with the invention that dissolve especially well in the respective plasticizer used. Compounds without plasticizers are also possible.

The use of the adhesion promoters of the invention is possible not only in plastisols based on polyvinyl chloride or copolymers of vinyl chloride. They can also be used in plastisols based on other polymers, e.g., polybutadienes, styrene butadienes, urethane caoutchoucs, acrylic ester caoutchoucs, styrene butadiene caoutchoucs and polyurethane based systems. Polyalkylene methacrylates deserve special mention in this regard.

Olefin Copolymers

These copolymers comprise α-olefins (or olefin blends) with particularly long chains and C numbers of $C_{10}$–$C_{24}$ and an unsaturated (olefinic) comonomer such as acrylic acid or methacrylic acid or acrylic acid esters or methacrylic acid esters, e.g., of $C_1$ to $C_4$ alcohols, or glycidyl acrylate or methacrylate, or an unsaturated comonomer such as maleic acid, maleic anhydride, fumaric acid or their esters. They are produced by radical copolymerization of the monomers in bulk or in solution at 80–200° C., preferably 100–160° C. The molecular weights of the copolymers lie generally between 2,000 and 20,000, preferably between 3,000 and 10,000.

Depending on molecular weight, olefin C number, and the type of comonomer, the copolymers range from viscous liquids to brittle solids.

The comonomer ratio of the olefin/maleic anhydride copolymers is preferably 1/1 to 1/2 and that of the olefin/acrylate copolymers 1/1 to 1/4.

Copolymeric imidoamines or amidoamines

The copolymers produced in the first stage are converted with polyamines in bulk or solvent. The imide formation from the maleic anhydride copolymers, for example, takes place at 130–180° C., in a solvent such as, e.g., xylene, under azeotropic removal of the reaction water, with an appropriate amine in an anhydride/amine molar ratio of 1/0.5 to 1/5, whereby the amine excess is preferred in the case of amines with more than one primary amino group. The use of an acid catalyst such as para-toluenesulfonic acid (p-TSA) promotes imide formation.

The amide formation from the acrylic acid ester copolymers takes place at 150–220° C. in solution or solvent-free as a result of the split-off of the ester alcohol and addition of the respective amine in an ester/amine molar ratio of 1/1 to 1/5.

Polyamines are understood to be compounds with at least two amino groups.

Polyamines suitable for imide, amide, or esteramine formation are aliphatic polyamines, possibly containing heteroatoms, for example, polyoxyalkylene polyamines; polyalkylene amines, such as ethylenediamine, diethylenetriamine, triethylenetetramine, tripropylenetetramine, tetraethylenepentamine, pentaethylene-hexamine, hexamethylenediamine, dimethylaminopropylamine; cycloaliphatic polyamines, such as 3,3'-dimethyl-4,4'-diaminodicyclohexylmethane and isophoronediamine; and heterocyclic polyamines, such as N-amino-ethylpiperazine and xylylenediamine.

The amino-group-containing radicals given in Formulas I, II, and III are derived from these and similar compounds.

Following completion of the imide or amide formation, the volatile components, such as solvents, excess amine, alcohol, and decomposition products are separated at elevated temperature and/or reduced pressure, and the resulting polymer dissolved in a plasticizer or solvent (e.g., dioctylphthalate, benzyl alcohol, or diisopropylnaphthalene), if appropriate.

Process for producing coverings

The adhesion promoters produced in accordance with the aforementioned processes, dissolved in plasticizer or solvent, are added 0.1 to 5 percent by weight (with respect to the total formulation) at room temperature to conventional PVC plastisols (fine-particle polyvinyl chloride, conventional plasticizers, fillers, additives).

The plastisols of the invention, applied to metallic substrates, coated (e.g., with electrodeposition coating (KTL)) if appropriate, are baked under conventional baking conditions (90–170° C.; 10–30 min) to form firmly adhering coverings.

PREPARATION OF THE ADHESION PROMOTERS

EXAMPLE 2

Polymeric imidoamine based on olefin/maleic anhydride copolymer and N-aminoethylpiperazine.

1,780 g $C_{14/16}$ alpha-olefin (8.7 mole) is placed with 560 g xylene in a 5 l quick-fit flask, flushed with $N_2$, and heated to 140° C. Within 150 min, maleic anhydride (853 g, 8.7 mole) and di-tert-butylperoxide (43 ml) are then added in 30 portions while stirring. Following an after-reaction of 60 min, the decomposition products of the starting agent and solvent and free olefin are distilled off (190° C., 25 mbar). The resulting polymer (2,500 g) has a molecular weight of 7,500 (GPC) and a melting point range of 91–97° C.

170 g (0.6 mole) of the resulting copolymeric anhydride is dissolved in 300 g xylene and added gradually to a solution at approximately 140° C. of 85 g (0.6 mole) N-aminoethylpiperazine, 160 g xylene, and 1 g p-TSA (60 min), whereby water is continuously removed from circulation under xylene reflux. After a further 120 min reaction time, the solvent and free amine are separated and the remaining polymeric imidoamine (247 g, flow point: 40–45° C.) is dissolved in 370 g diisopropylnaphthalene at 150° C. The 40% brown, slightly cloudy solution (product A) has a kinematic viscosity (Ubbelohde) of 12,000 $mm^2/s$ (cSt) at 25° C.

EXAMPLE 3

Polymeric amidoamine based on olefin/methyl acrylate copolymer and dimethylaminopropylamine.

785 g $C_{14}$ alpha-olefin (4 mole) is placed with 1,000 g xylene in a 5 l quick-fit flask, flushed with $N_2$, and heated to 100° C. Within 180 min, a solution of 689 g methyl acrylate (8 mole) and 80 ml starting agent (tertbutylperoxy-2-ethylhexanoate) is then added. Following an after-reaction of 60 min, the decomposition products of the starting agent and the solvent and free olefin are distilled off (200° C., 25 mbar). The resulting polymer (1,150 g) has a molecular weight of 4,500 (GPC) and a kinematic viscosity of 8,800 $mm^2/s$ (cSt) at 40° C. The monomer ratio of olefin to methyl acrylate is 1:3.1.

159 g (1 mole) of the resulting copolymeric methyl acrylate and 408 g (4 mole) dimethylaminopropylamine are placed into a 1 l autoclave and heated to 180° C. while stirring. After 20 h reaction time, methanol and excess amine are separated at 180° C. and 25 mbar. The resulting polymer (229 g), clear at room temperature, with a melting point range of 36–37° C., is dissolved at 120° C. in 229 g dioctylphthalate. The resulting 50% clear brown solution (product B) has a kinematic viscosity (Ubbelohde) of 16,000 $mm^2/s$ (cSt) at 40° C.

PRODUCING THE PLASTISOLS

EXAMPLE 4

0.5 g, 1 g, and 2 g of the adhesion promoter solution of Example 2 or 3 (product A or B) are added to 100 g plastisol consisting of:

- 100 parts PVC capable of forming a paste, with a k value of 70;
- 125 parts dioctylphthalate;
- 80 parts filler, chalk;
- 3 parts tribasic lead sulfate.

Characterization of the plastisols

The plastisols of the invention, produced with the adhesion promoter solutions A and B, are compared to an adhesion-promoter-free plastisol (blank) and a reference product of the "polyaminoamide" class with respect to rheological properties (yield point, thixotropy, structural viscosity), storage stability, and properties of the baked compound, such as adhesive strength on a KTL metal plate (type: BASF series 7628) and compound discoloration ($Y_I$: yellowness index) as a function of adhesion promoter quantity.

The examples described are representative of other members of the class of adhesion promoters in accordance with the invention, as well as of other conventional plastisol formulations and KTL metal plates.

The plastisols containing adhesion promoters are applied with a doctor blade (10 mm wide×2 mm high) in strips on the KTL metal plate and hardened during 20 min baking time at 130° C. and 160° C. After cooling for 60 min, the adhesive strength (manually on a scale of 1–4) and the yellowness index of the 160° C. sample are determined.

TABLE

| Adhesion Type | Promoter Quantity (%) | Adhesive 130° C. | Strength[a] 160° C. | Color[b] ($Y_I$) 160° C. |
|---|---|---|---|---|
| Blank | — | 1 | 1 | 20 |
| Reference[c] | 0.5 | 1 | 2 | 50 |

TABLE-continued

| Adhesion Type | Promoter Quantity (%) | Adhesive 130° C. | Strength[a] 160° C. | Color[b] ($Y_I$) 160° C. |
|---|---|---|---|---|
|   | 1.0 | 2 | 3–4 | 72 |
|   | 2.0 | 3 | 4 | 83 |
| A | 0.3 | 3 | 3–4 | 37 |
|   | 0.5 | 3 | 4 | 44 |
|   | 1.0 | 3 | 4 | 51 |
|   | 2.0 | 2 | 4 | 73 |
| B | 0.3 | 3 | 3 | 39 |
|   | 0.5 | 3 | 4 | 46 |
|   | 1.0 | 3 | 4 | 62 |

[a]Adhesive strength: 1. No adhesion; separation extremely easy. 2. Slight adhesion; separable without residue. 3. Good adhesion; compound separable but partially remains on substrate. 4. Maximum adhesion; compound cannot be separated without destruction.
[b]Yellowness index $Y_I$, as per DIN 6167, of the compound obtained at a baking temperature of 160° C.
[c]Polyaminoamide based on dimeric/trimeric fatty acid and triethylenetetramine (40% solution).

The table confirms the high efficiency of the adhesion promoters A and B (0.5 parts by weight of the adhesion promoter solution provide maximum adhesion after baking at 160° C.), with slight compound discoloration.

Moreover, prior to baking, the plastisols of the invention (Example A) are rheologically characterized and compared to the reference product at the same concentration employed (1%, 40% solution) using a rotation viscosimeter at 20° C. as a function of storage time.

While the invention has been described in detail and with reference to specific examples thereof, it will be apparent to one skilled in the art that various changes and modifications can be made therein without departing from the spirit and scope thereof.

What is claimed is:

1. A process for producing a plastisol composition which comprises adding 0.1–5 wt %, based on total plastisol composition, of an adhesion promoter to a plastisol comprising polyvinyl chloride, vinyl chloride copolymer or polyalkylene methacrylate in a plasticizer to form the plastisol composition, wherein the adhesion promoter is a product of:

reacting an α-olefin by radical polymerization with at least one monounsaturated carboxylic acid or monounsaturated carboxylic acid ester or anhydride to form a copolymer; and reacting the copolymer with at least one polyamine having at least one primary amino group to form the adhesion promoter, wherein the adhesion promoter is represented by Formula I, II or III

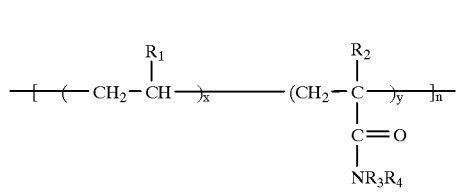

where x=1; y=1–4; n=5–50; $R_1$=$C_6$–$C_{22}$ alkyl radical; $R_2$=H or $CH_3$; $R_3$=H or $C_1$–$C_3$ alkyl radical; and $R_4$ is a hydrocarbon radical with 2 to 14 carbon atoms and at least one amino group; or $R_3$ and $R_4$ form a piperazine ring with the amide nitrogen atom;

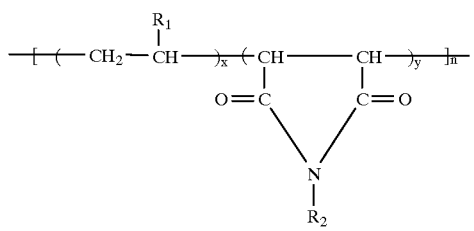

wherein x=1; y=1–2; n=5–50; $R_1=C_8–C_{22}$ alkyl radical; and $R_2$ is a hydrocarbon radical with 2 to 14 carbon atoms and at least one amine group;

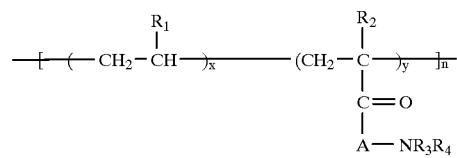

wherein x=1; y=1–4; n=5–50; $R_1=C_8–C_{22}$ alkyl radical; $R_2$=H or $CH_3$; A=—$OCH_2CH(OH)$—$CH_2$—; and $R_3$ and $R_4$ are defined as in Formula I.

2. A process for producing a plastisol composition which comprises adding 0.1–5 wt %, based on total plastisol composition, of an adhesion promoter to a plastisol comprising polyvinyl chloride, vinyl chloride copolymer or polyalkylene methacrylate in a plasticizer to form the plastisol composition, wherein the adhesion promoter is a product of:

reacting an α-olefin by radical polymerization with at least one monounsaturated dicarboxylic acid or monounsaturated dicarboxylic acid ester or anhydride to form a copolymer; and reacting the copolymer with at least one polyamine having at least one primary amino group to form the adhesion promoter, wherein the adhesion promoter is represented by Formula II

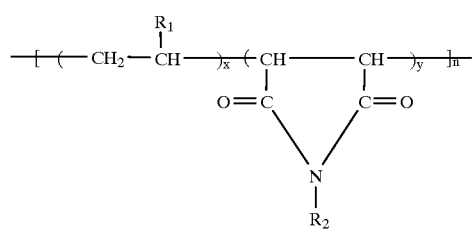

wherein x=1; y=1–2; n=5–50; $R_1=C_8–C_{22}$ alkyl radical; and $R_2$ is a hydrocarbon radical with 2 to 14 carbon atoms and at least one amine group.

3. The process of claim 2 in which the copolymer is the radical polymerization reaction product of an α-olefin having 14–16 carbon atoms and maleic anhydride which copolymer is then reacted with N-aminoethylpiperazine.

4. The process according to claim 1, wherein said monounsaturated carboxylic acid or monounsaturated carboxylic acid derivative is selected from the group consisting of acrylic acid, acrylic acid methyl ester, acrylic acid ethyl ester, methacrylic acid, methacrylic acid methyl ester and methacrylic acid ethyl ester, and said adhesion promoter is an amidoamine.

5. The process according to claim 2, wherein said monounsaturated carboxylic acid or monounsaturated carboxylic acid derivative is selected from the group consisting of maleic acid, maleic anhydride and fumaric acid, and said adhesion promoter is an imidoamine.

6. The process according to claim 1, wherein said monounsaturated carboxylic acid or monounsaturated carboxylic acid derivative is a glycidyl ester, and said adhesion promoter is an esteramine.

7. The process according to claim 2, wherein said polyamine is N-aminoethylpiperazine.

* * * * *

UNITED STATES PATENT AND TRADEMARK OFFICE
CERTIFICATE OF CORRECTION

PATENT NO.    :   6,140,385
DATED         :   October 31, 2000
INVENTOR(S)   :   Bowers, Jr. et al.

It is certified that error appears in the above-identified patent and that said Letters Patent is hereby corrected as shown below:

Column 12, lines 47 to 59, the formula:

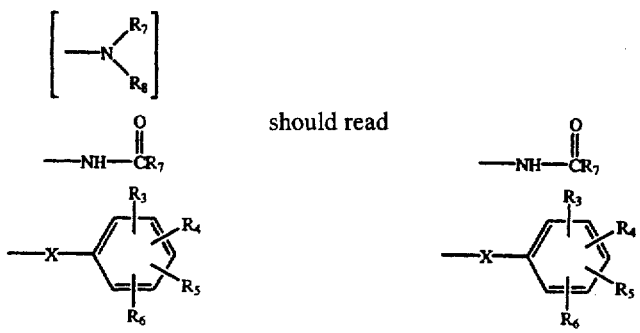

Column 13, line 4, cancel "or alkylaryl".

UNITED STATES PATENT AND TRADEMARK OFFICE
CERTIFICATE OF CORRECTION

PATENT NO. : 6,140,385
DATED : October 31, 2000
INVENTOR(S) : Bowers, Jr. et al.

It is certified that error appears in the above-identified patent and that said Letters Patent is hereby corrected as shown below:

Column 15, after line 21, insert in the formula:

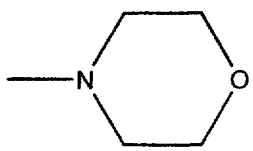

Column 15, after line 48, "wherein x is 4 to 5", insert in the formula:

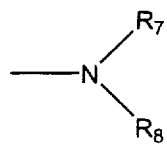

Column 15, line 64, "C7 C24" should read --C7 to C24--.

Column 17, line 2, "alylalkyl" should read --arylalkyl--.

Signed and Sealed this

Fifteenth Day of May, 2001

*Attest:*

NICHOLAS P. GODICI

*Attesting Officer*     *Acting Director of the United States Patent and Trademark Office*